(12) United States Patent
Yuan et al.

(10) Patent No.: US 12,238,743 B2
(45) Date of Patent: Feb. 25, 2025

(54) ACKNOWLEDGEMENT OF GROUP COMMON DCI FOR MU-MIMO

(71) Applicant: QUALCOMM Incorporated, San Diego, CA (US)

(72) Inventors: Fang Yuan, Beijing (CN); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 371 days.

(21) Appl. No.: 17/904,857

(22) PCT Filed: May 1, 2020

(86) PCT No.: PCT/CN2020/088545
§ 371 (c)(1),
(2) Date: Aug. 23, 2022

(87) PCT Pub. No.: WO2021/217681
PCT Pub. Date: Nov. 4, 2021

(65) Prior Publication Data
US 2023/0113419 A1  Apr. 13, 2023

(51) Int. Cl.
*H04W 72/232* (2023.01)
*H04L 1/1829* (2023.01)

(52) U.S. Cl.
CPC ......... *H04W 72/232* (2023.01); *H04L 1/1861* (2013.01)

(58) Field of Classification Search
CPC .. H04W 72/232; H04W 72/23; H04L 1/1861; H04L 1/1614; H04L 1/1896; H04L 5/0055; H04L 5/0053; H04L 5/0007
See application file for complete search history.

(56) References Cited

U.S. PATENT DOCUMENTS

| | | | |
|---|---|---|---|
| 2012/0236812 A1* | 9/2012 | Chen | H04W 72/23 370/329 |
| 2018/0077698 A1 | 3/2018 | Takeda et al. | |
| 2019/0159206 A1* | 5/2019 | Sun | H04W 72/23 |
| 2020/0389912 A1* | 12/2020 | Baldemair | H04W 72/232 |
| 2022/0014314 A1* | 1/2022 | Wang | H04L 5/0055 |

FOREIGN PATENT DOCUMENTS

| | | |
|---|---|---|
| CN | 102104459 A | 6/2011 |
| CN | 103532688 A | 1/2014 |
| WO | 2019029727 A1 | 2/2019 |

OTHER PUBLICATIONS

International Search Report and Written Opinion—PCT/CN2020/088545—ISA/EPO—Jan. 27, 2021.

\* cited by examiner

*Primary Examiner* — Walli Z Butt
(74) *Attorney, Agent, or Firm* — Arent Fox, LLP

(57) ABSTRACT

A configuration to enable a UE to acknowledge receipt of group common DCI. The apparatus receives, from a base station, group common DCI. The group common DCI being for a set of UEs. The set of UEs including the UE. The apparatus determines whether the group common DCI includes at least one DAI. The apparatus transmits an ACK or a NACK in response of the determination of the group common DCI including the DAI. The apparatus communicates, with the base station, based on the group common DCI.

30 Claims, 12 Drawing Sheets

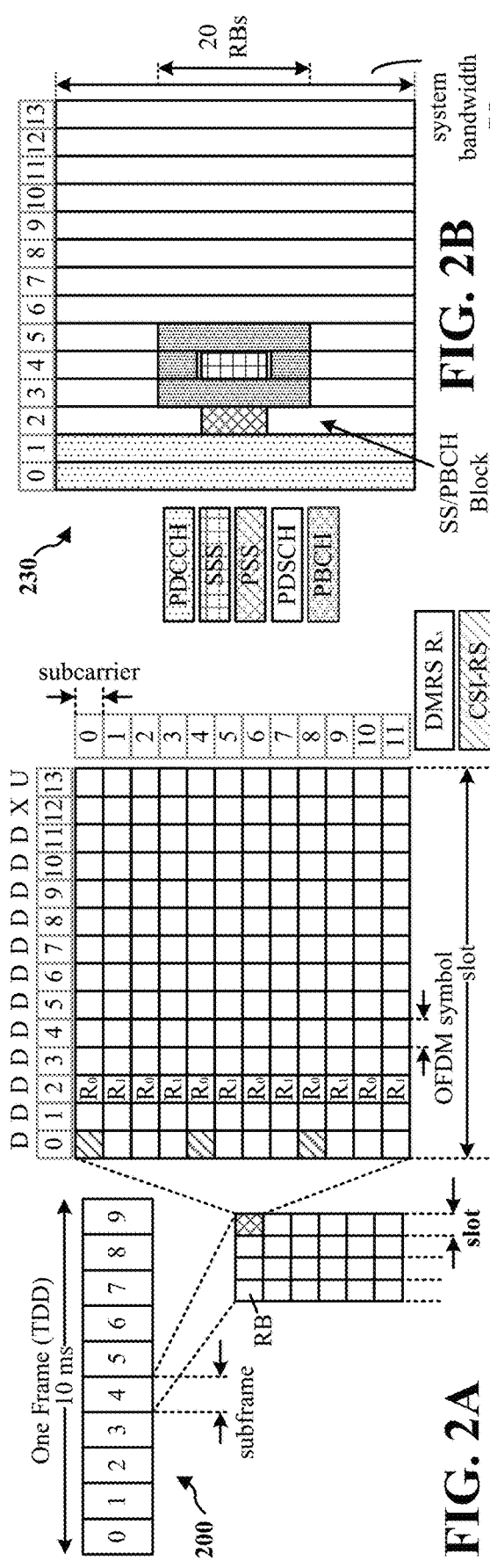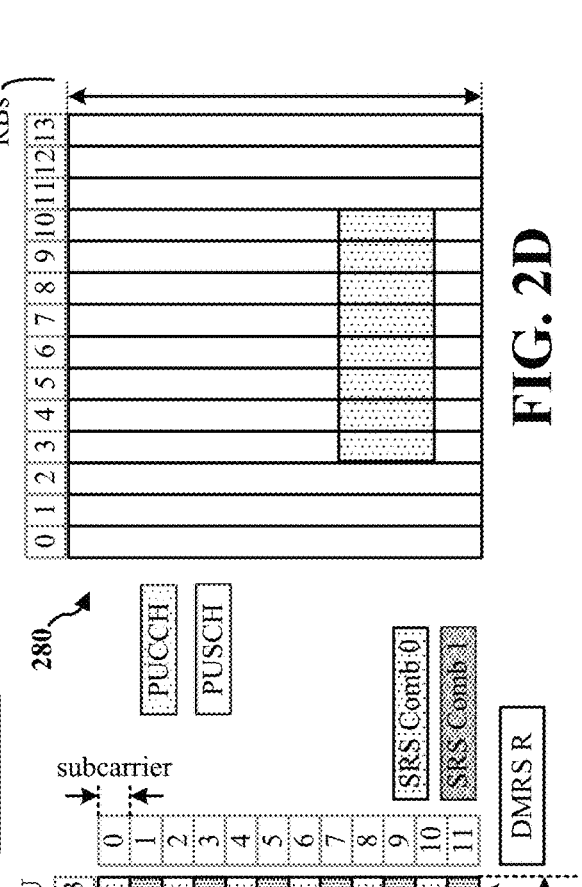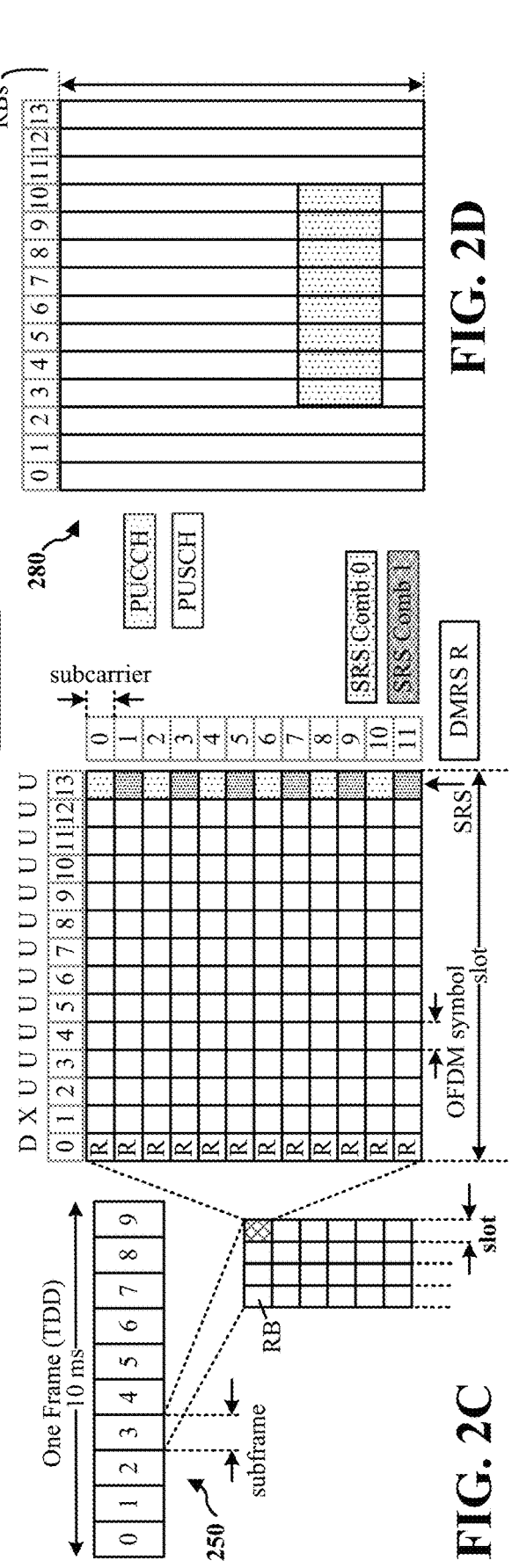
FIG. 2A
FIG. 2B
FIG. 2C
FIG. 2D

ACKNOWLEDGEMENT OF GROUP COMMON DCI FOR MU-MIMO

CROSS REFERENCE TO RELATED APPLICATION(S)

This application is a National Phase entry of PCT Application No. PCT/CN2020/088545, entitled "ACKNOWLEDGEMENT OF GROUP COMMON DCI FOR MU-MIMO" and filed on May 1, 2020, which is expressly incorporated by reference herein in its entirety.

BACKGROUND

Technical Field

The present disclosure relates generally to communication systems, and more particularly, to acknowledging a group common downlink control information (DCI) for a multi-user (MU) multiple input and multiple output (MIMO) (MU-MIMO) uplink/downlink communication.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a UE. The device may be a processor and/or a modem at a UE or the UE itself. The apparatus receives, from a base station, group common downlink control information (DCI). The group common DCI being for a set of UEs. The set of UEs including the UE. The apparatus determines whether the group common DCI includes at least one downlink assignment index (DAI). The apparatus transmits an acknowledgement (ACK) or a non-acknowledgement (NACK) in response of the determination of the group common DCI including the DAI. The apparatus communicates, with the base station, based on the group common DCI.

In an aspect of the disclosure, a method, a computer-readable medium, and an apparatus are provided. The apparatus may be a device at a base station. The device may be a processor and/or a modem at a base station or the base station itself. The apparatus configuring, for a set of user equipments (UEs), a group common downlink control information (DCI). The apparatus transmits, to the set of UEs, the group common DCI. The group common DCI comprising at least one downlink assignment index (DAI) for at least one UE of the set of UEs. The apparatus receives, from a first UE of the set of UEs, an acknowledgement (ACK) or a non-acknowledgement (NACK) indicating whether the group common DCI received by the first UE comprises a DAI. The apparatus communicates, with the first UE, based on the group common DCI.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
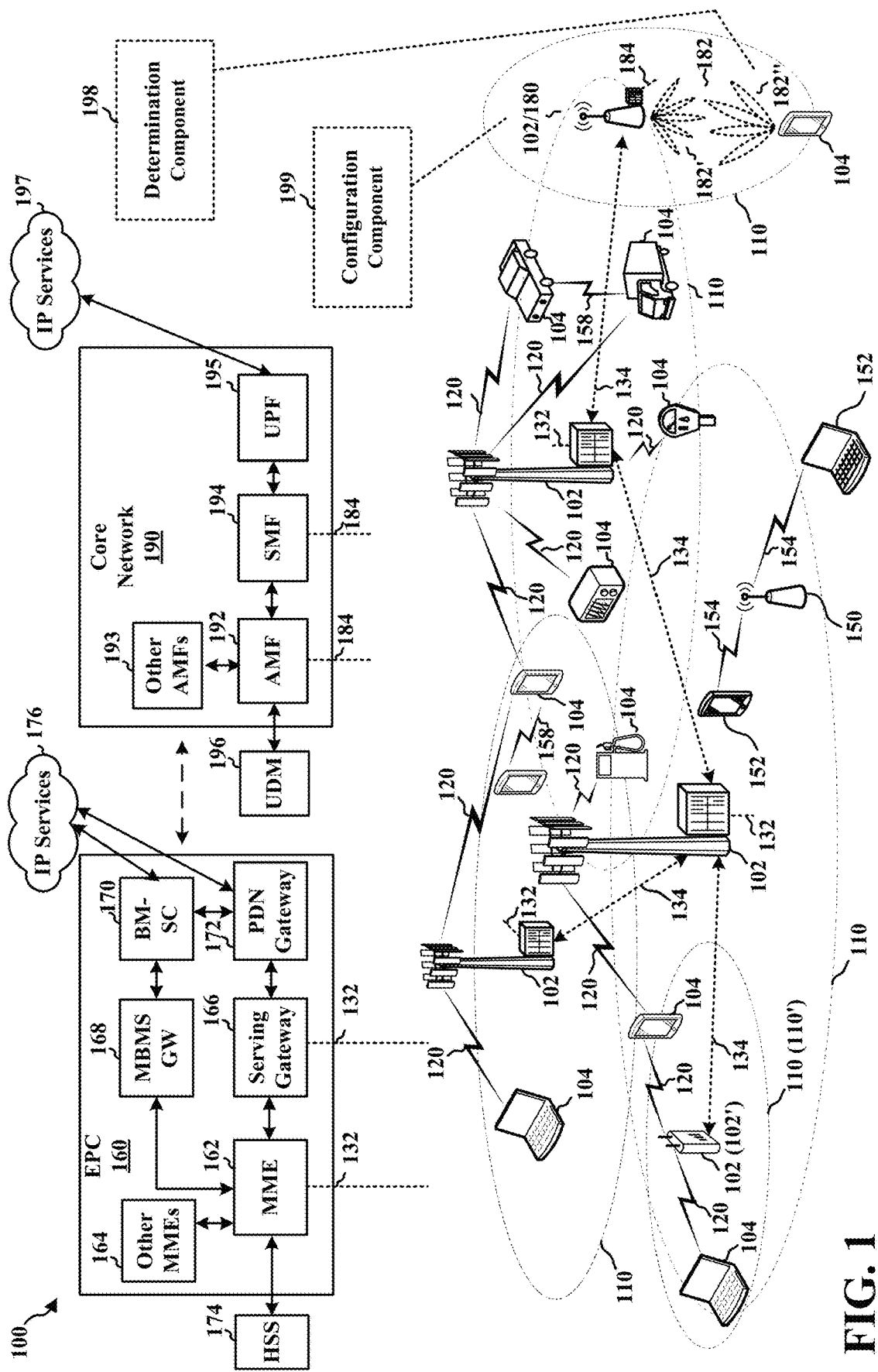
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR. The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to acknowledge receipt of a group common DCI. For example, the UE 104 of FIG. 1 may include a determination component 198 configured to determine whether the group common DCI include at least one DAI. The UE 104 may receive, for a base station 102/180, a group common DCI. The group common DCI may be for a set of UEs. The set of UEs including the UE 104. The UE 104 may determine whether the group common DCI includes at least one DAI. The UE 104 may transmit an ACK or a NACK in response to the determination of the group common DCI including the DAI. The UE 104 may communicate with the base station 180 based on the group common DCI.

Referring again to FIG. 1, in certain aspects, the base station 180 may be configured to configure a UE to acknowledge receipt of a group common DCI. For example, the base station 180 may comprise a configuration component 199 configured to a group common DCI for a set of UEs. The base station 180 may configure the group common DCI for the set of UEs. The base station 180 may transmit, to the set of UEs, the group common DCI. The group common DCI may comprise at least one DAI for at least one UE of the set of UEs. The base station 180 may receive, from a first UE of the set of UEs, an ACK or a NACK indicating whether the group common DCI received by the first UE includes the DAI. The base station 180 may communicate with the first UE based on the group common DCI.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu * 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
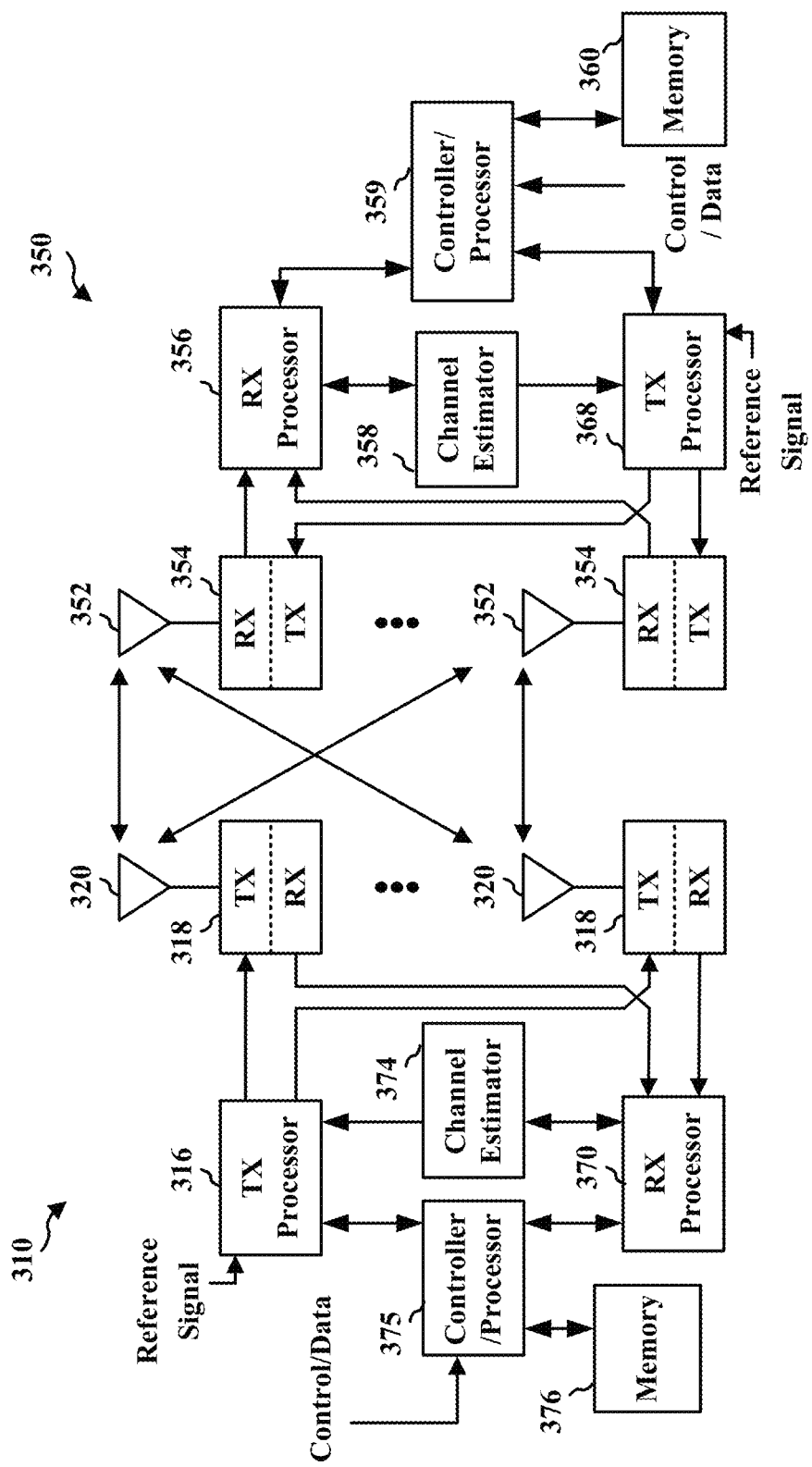
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

In wireless communication systems, a base station may serve multiple UEs, such as when UEs are densely located within a portion of a coverage area. In such cases the array may be split into multiple sub-arrays for the MU-MIMO. That is, when multiple UEs are disposed spatially close to each other, the base station may generate and transmit a beamformed signal to serve the multiple UEs that are disposed spatially close to each other. For industrial internet-of-things (IIoT), a UE may not need a large bandwidth for the UE's payload over a communication link. UEs that can be served by the same or close beams may be grouped together and frequency division multiplexed (FDM) so as to save spatial dimensions for multiplexing other UEs in different directions. That is, since the communication associated the IIoT generally does not require a heavy payload, the base station may FDM the communication for the UE group, such as multiple UEs that are disposed spatially close, into the same beam formed signal or close beam formed signals to reserve the resources of the base station for communicating with other UEs in different directions. Grouping of spatially close UEs may also be attractive in the case of multiple beam sweeps because the multiple beam sweeps can be swept altogether as a group. Group formation can be updated based on UE and environmental mobility. That is, the base station may receive access the information gathered, and based on the assessment of the communication environment, the base station may dynamically or semi-statically update the UE groups. Grouping of the UEs may reduce the beam measuring and reporting overhead incurred by the base station and the UEs, for example. in cases such as a vehicle platooning. Grouping of the UEs may also reduce the beam sweep signaling overhead.

Figure 5:
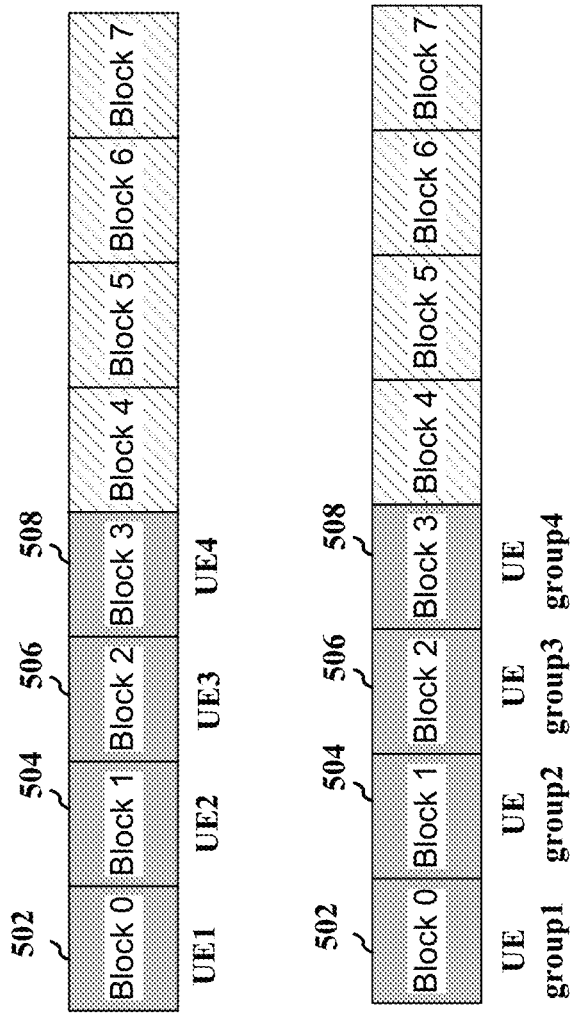
FIG. 5 is a diagram illustrating configuration of the group common DCI including resource blocks.

The DCI may include cyclic redundancy check (CRC) parity bits. The base station may scramble the DCI including the CRC parity bits by the RNTI. The UE may receive the DCI and descramble the scrambled DCI using the RNTI of the UE. The UE may check if there is a CRC parity error to determine whether the received DCI is for the payload of the UE. Particularly, the UE may compute the CRC of the payload and compare that with the CRC transmitted with the payload to determine if an error occurred. In case the CRC of the DCI descrambled using the RNTI of the UE matches the CRC, the UE may determine that the descrambled DCI is directed to the UE, and the UE may schedule the communication channel with the base station according to the indication of the corresponding DCI. The DCI format 2_x may be used for a group of UEs, and the RNTI may also be shared by the group of UEs. The shared RNTI may include an indication such as a transmit power control (TPC)-PUCCH-RNTI (TPC-PUCCH-RNTI), or a TPC-PUSCH-RNTI. DCI format 2_x may include multiple indication blocks, such as block number 1, block number 2, ..., block number N. The starting bit of each indication block (or block) may be indicated by RRC signaling, and the applicable serving cell may be RRC configured. That is, when the DCI and the RNTI are shared for the UE group, the DCI indication block indicated by the RRC signaling may be for each UE of the group of UEs. Accordingly, each indication block of the DCI according to the DCI format 2_x may include the ID of the DCI for each UE of the group of UEs. For example, when a group of UEs include four UEs (for example, UE1, UE2, UE3, and UE4), the format 2_x DCI for the group of UEs may include the indication blocks Block 0 502, Block 1 504, Block 2 506, and Block 3 508, as shown in FIG. 5. In some aspects, each block may include an ID for the group of UEs (e.g., UE group1 502, UE group2 504, UE group3 506, and UE group4 508), respectively, as shown in FIG. 5.

The group common DCI may be used to indicate information for a group of UEs. The group common DCI may include the beam indication or the PL-RS indication. The indicated IDs for the beam or PL-RS may be UE specific, or group common. Also, the same RNTI or different RNTIs may be used in the group common DCI to indicate different information for a group of UEs. The UE and the UE groups may determine which ID is directed to the channel of the UE and the UE groups by RRC signaling.

Figure 4:
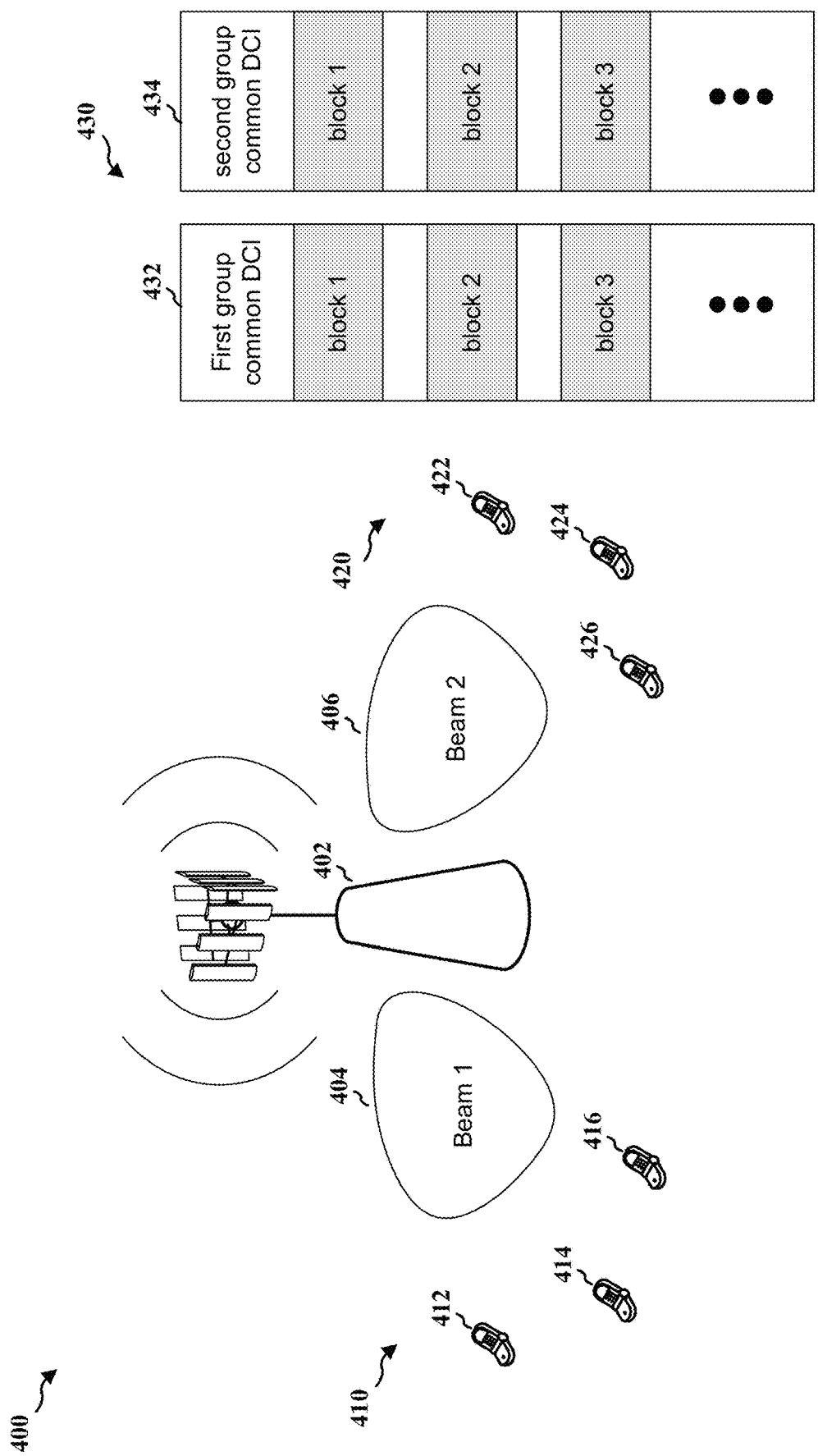
FIG. 4 is a diagram illustrating configuration of the group common DCI for the MU-MIMO communication.

FIG. 4 is a diagram 400 illustrating two configurations of the group common DCI 430 for the MU-MIMO communication. In one configuration, the base station 402 may communicate with the UEs 412, 414, 416, 422, 424, and 426. The base station 402 may assess the communication environment, and group the UEs to form a first UE group 410 including UEs 412, 414, and 416 and a second UE group 420 including UEs 422, 424, and 426. The base station 402 and the first UE group 410 may communicate through a first beamformed signal 404, and the base station 402 and the second UE group 420 may communicate through a second beamformed signal 406. The base station 402 may generate a first group common DCI 432 including a number of indication block for the first UE group 410 including UEs 412, 414, and 416, and a second group common DCI 434 including a number of indication block for the second UE group 420 including UEs 422, 424, and 426.

The present disclosure relates to improving the manner in which a base station may communicate with a group of UEs based on a group common DCI. For example, a base station may configure a group common DCI for a group of UEs. The group common DCI may configure each UE within the group of UEs to acknowledge receipt of the group common DCI based on a downlink assignment index (DAI) within the group common DCI.

Legacy DCI (e.g., DCI format 1_0 or DCI format 1_1) may include a counter DAI (cDAI) value. The value of the cDAI may denote the accumulative number of serving cell, PDCCH monitoring occasion pair(s) in which PDSCH reception(s) or SPS PDSCH release associated with the legacy DCI. The cDAI may be arranged based on the current serving cell and current PDCCH monitoring occasion, in ascending order of serving cell index and then in ascending order of PDCCH monitoring occasion index. Legacy DCI may also include a total DAI (tDAI) value. The value of the tDAI may denote the total number of serving cell, PDCCH monitoring occasion pair(s) in which PDSCH reception(s) or SPS PDSCH release associated with the legacy DCI. The tDAI may be arranged based on the current PDCCH monitoring occasion and may be updated from PDCCH monitoring occasion to PDCCH monitoring occasion.

Figure 6:
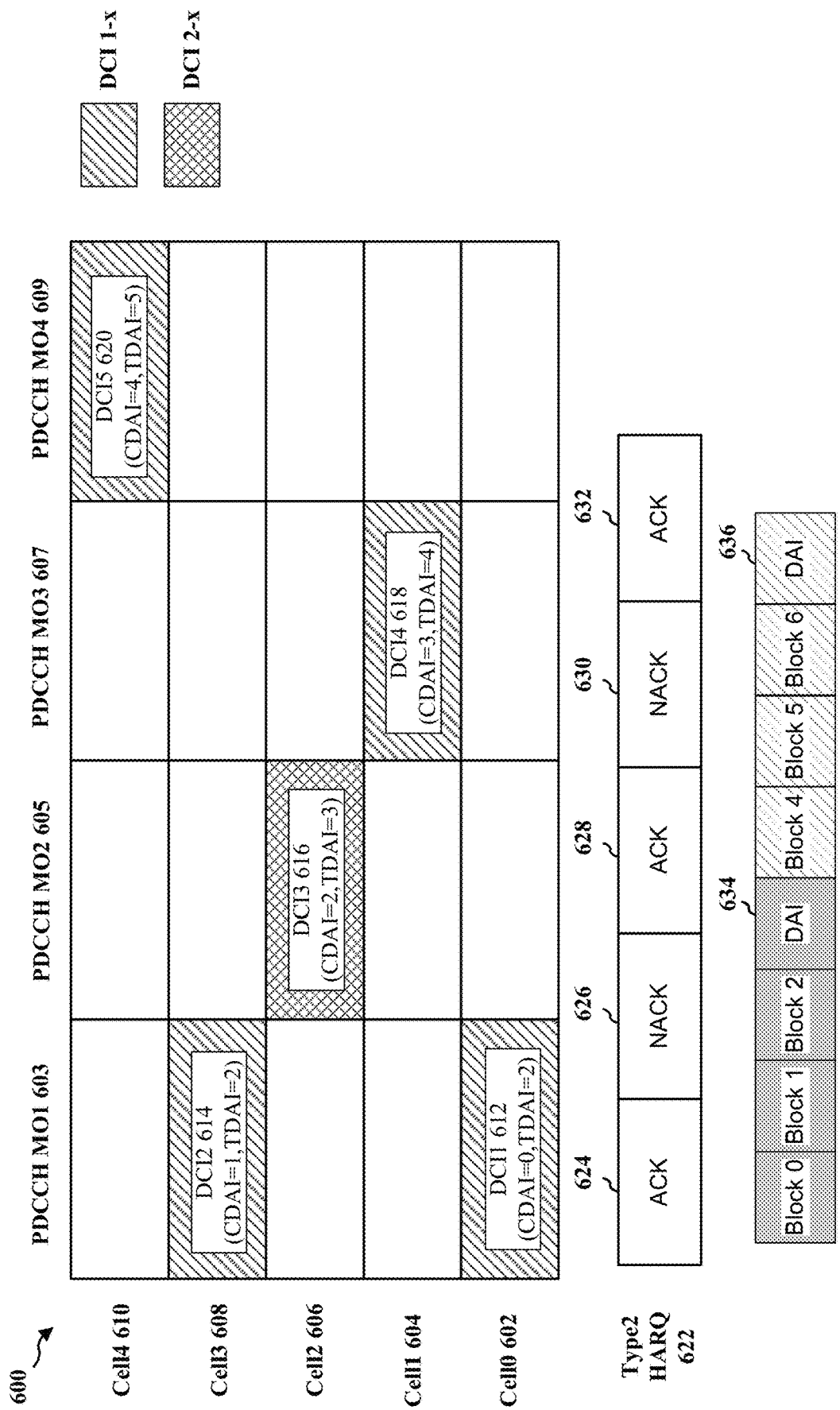
FIG. 6 is a diagram illustrating configuration of the group common DCI including a DAI.

FIG. 6 is a diagram 600 illustrating a configuration for acknowledging a group common DCI including a DAI. In instances where a UE from a set of UEs receives a group common DCI, the UE may acknowledge the receipt of the group common DCI. In order to send the acknowledgement to the base station, the UE may receive a configuration as to how the acknowledgement to the base station should be transmitted. In some aspects, UEs may be configured to support a DAI indicated per UE in the group common DCI to acknowledge reception of the group common DCI. The DAI may indicate instructions for the UE to transmit the acknowledgement (e.g., ACK or NACK) to the base station. For example, in the aspect of FIG. 6, the group common DCI may include multiple blocks for a first UE1 (e.g., Block 0-Block 2) and for a second UE2 (e.g., Block 4-Block 6). The DAI 634 for the first UE1 may be appended to the end of the set of blocks (e.g., Block 0-Block 2) for the first UE1. The DAI 636 for the second UE2 may be appended to the end of the set of blocks (e.g., Block 4-Block 6) for the second UE2. Appending the DAI at the end of the set of blocks for the respective UEs allows for the DAI to be indicated within the group common DCI (e.g., DCI 2_x) on a per UE basis.

The DAI (e.g., 634, 636) may include a cDAI value or cDAI and a tDAI. In some aspects, the tDAI may have a value within the range of 0 to 3 after a modulo operation with 4. In instances where the UE receives the group common DCI, the UE may generate a bit (e.g., ACK or NACK bit) to acknowledge reception of the group common DCI. In some aspects, the group common DCI may be used for beam or PL-RS indication.

The diagram 600 may include multiple cells (e.g., 602, 604, 606, 608, and 610) and multiple PDCCH monitoring occasions (e.g., 603, 605, 607, and 609). In some aspects, the multiple cells may be multiple component carriers in carrier aggregation. The cDAI may be counted per cell and per PDCCH monitoring occasion. For example, for the cell0 602 in the first PDCCH monitoring occasion 603, may receive a DCI1 612 with the value of cDAI being 0 to indicate the first DAI within the first PDCCH monitoring occasion. For the cell3 608 also in the first PDCCH monitoring occasion 603, may receive a DCI2 614 with the value of cDAI being 1 to indicate the second DAI within the first PDCCH monitoring occasion. In the second PDCCH monitoring occasion 605, cell2 606 may receive DCI3 616 with the value of cDAI being 2 to indicate the third DAI within the second PDCCH monitoring occasion. In the third PDCCH monitoring occasion 607, cell1 604 may receive DCI4 618 with the value of cDAI being 3, and in the fourth PDCCH monitoring occasion 609, the cell4 610 may receive DCI5 620 with the value of cDAI being 4.

The tDAI may be counted per PDCCH monitoring occasion. For example, in the first PDCCH monitoring occasion 603, cell0 602 and cell3 608 received a DCI, such that the value of tDAI for each of cell0 602 and cell3 608 is 2. In the second PDCCH monitoring occasion 605, the value of the tDAI in DCI3 616 is 3 to indicate the third DCI received. While the value of tDAI of DCI4 618 in the third PDCCH monitoring occasion 607 is 4, and the value of tDAI of DCI5 620 is 5. In the diagram 600, the values of cDAI and tDAI are just for illustrative purposes, and actual values of cDAI and tDAI can be indicated by 0-3 based on a modulo operation with 4.

In the example of FIG. 6, DCI1 612, DCI2 614, DCI4 618, and DCI5 620 may be legacy DCIs (e.g., DCI 1-x), and while the DCI3 616 may be a group common DCI (e.g., DCI 2-x). In some aspects, DCI1 612, DCI2 614, DCI4 618, and DCI5 620 may be configured for scheduling PDSCH for the respective UEs, which may be UE specific. The DCI3 616 may configure a HARQ-ACK codebook for all the DCIs based on the order its cDCI value and tDAI value. For example, the order of the ACK/NACK bits may be based on the order of the cDAI. For type2 HARQ codebook 622, the order of the ACK/NACK bits 624-632, correspond to the order of DAI in the DCIs were received, such that the type2 HARQ codebook size may be dynamically indicated by the DCI. The bit value 624 may correspond to DCI1 612, the bit value 626 may correspond to DCI2 614, the bit value 628 may correspond to DCI3 616, the bit value 630 may correspond to DCI4 618, and the bit value 632 may correspond to DCI5 620. The DAI may be utilized to determine the bit position of the ACK/NACK bit per UE in the HARQ-ACK codebook. As such, the ACK bit 628 may be the bit position that acknowledges the receipt of the group common DCI for DCI3 616. The bit positions 624, 626, 630, and 632 may be associated with the other DCIs (e.g., DCI1 612, DCI2 614, DCI4 618, and DCI5 620). In some aspects, the tDAI value may indicate the order of the bit position within the codebook. For example, DCI3 616 has a tDAI value of 3, as such the bit position of the ACK bit 628 is in the third position within the codebook.

Figure 7:
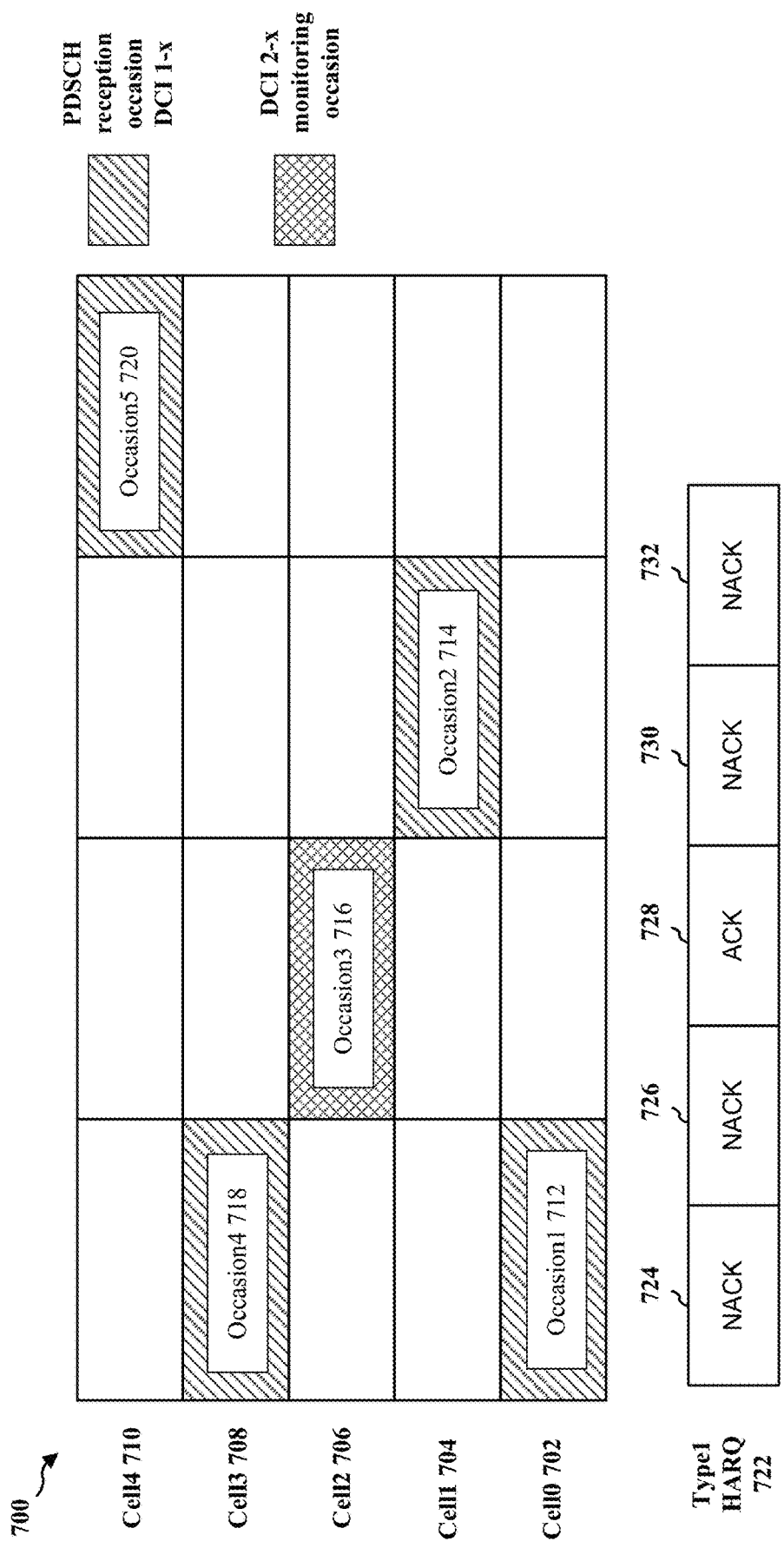
FIG. 7 is a diagram illustrating an acknowledgement of a DAI within the group common DCI.

FIG. 7 is a diagram 700 illustrating a configuration for acknowledging a group common DCI. The diagram 700 may include multiple cells (e.g., 702, 704, 706, 708, and 710) and multiple DCI or PDSCH reception monitoring occasions. In some aspects, the multiple cells may be multiple component carriers in carrier aggregation. In some aspects, for example when a DAI is not indicated in the group common DCI, the UE may be configured to transmit the acknowledgement (e.g., ACK or NACK) to the base station based on a group common DCI monitoring occasion. The UE may be configured to generate a codebook based on the group common DCI monitoring occasions. In the aspect of FIG. 7, there are five DCI monitoring or PDSCH reception occasions (e.g., 712, 714, 716, 718, and 720), however, the disclosure is not intended to be limited to the aspects provided herein. In some aspects, there can be one or more DCI monitoring or PDSCH reception occasions. The DCI monitoring occasions may be utilized for receiving group common DCI.

In the aspect of FIG. 7, the UE may be configured to generate a type1 HARQ codebook to acknowledge the group common DCI. For example, the PDSCH reception occasions 712, 714, 718, and 720 may be scheduled by legacy DCI which may be UE specific, while occasion3 716 may be scheduled by the group common DCI (e.g., DCI2-x). Thus, for the aspect of FIG. 7, the UE may know that the bit position to acknowledge the group common DCI is the third bit position in the type1 codebook, due to the group common DCI being received in the third DCI monitoring or PDSCH reception occasion. As such, the UE may generate the type1 HARQ codebook 722 having bits 724, 726, 728, 730 and 732, such that bit 724 corresponds to occasion1 712, bit 726 correspond to occasion2 714, bit 728 corresponds to occasion 3 716, bit 730 corresponds to occasion4 718, and bit 732 corresponds to occasions 720, such that the type1 HARQ codebook size may be statically determined by the DCI monitoring or PDSCH reception occasions. If a group common DCI is received in a DCI monitoring occasion, then the UE may generate an ACK bit based on the order of the DCI monitoring or PDSCH reception occasion. If a group common DCI is not received in a monitoring occasion, then the UE may generate a NACK bit based on the order of the DCI monitoring or PDSCH reception occasion. For example, in the type1 HARQ codebook 722, the UE generates NACK bits for bits 724, 726, 730 and 732, while generating an ACK bit for bit 728 if a group common DCI is not monitored in DCI monitoring occasion 716. Since the only group common DCI was received at occasion3 716, the ACK bit is generated and placed in the bit position 728 which corresponds to occasion3 716, while NACK bits are generated for the bits 724, 726, 730 and 732, indicating that a group common DCI was not received in such bits.

Figure 8:
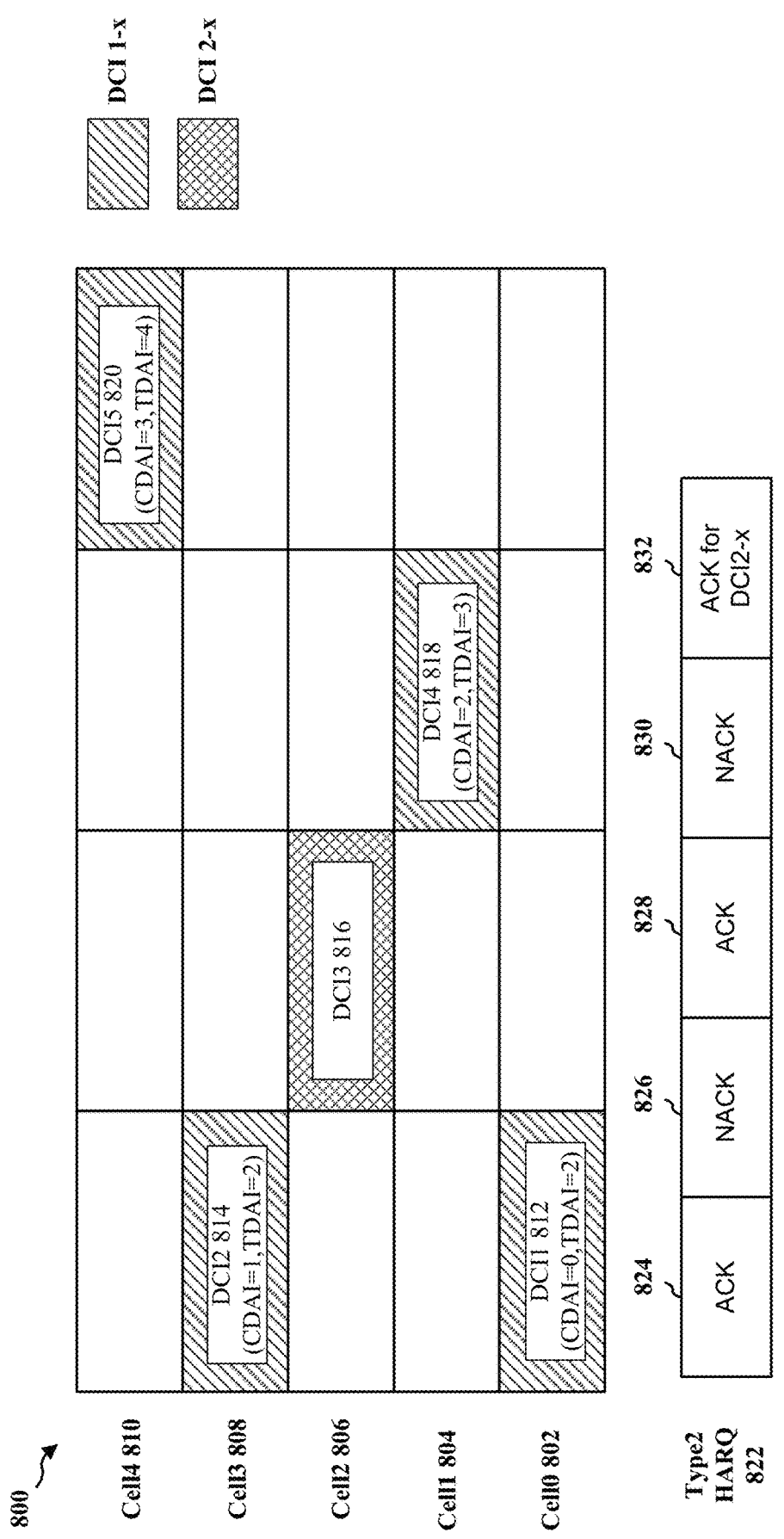
FIG. 8 is a diagram illustrating a codebook for acknowledgement of a DAI within the group common DCI.

FIG. 8 is a diagram 800 illustrating a configuration for acknowledging a group common DCI. The diagram 800 may include multiple cells (e.g., 802, 804, 806, 808, and 810) and multiple DCI monitoring or PDSCH occasions. In some aspects, the UE may be configured to acknowledge the reception of group common DCI without indicating a DAI value in group common DCI. For example, if type2 HARQ codebook is configured for PDSCH, the ACK/NACK bit for group common DCI may be appended to the type2 HARQ codebook generated by the DAI. Type2 HARQ codebook may be generated based on the DAI indication, however, in aspects where a DAI indication is not present, the UE may append that ACK/NACK bit to acknowledge the group common DCI at the end of the type2 HARQ codebook. For example, the type2 HARQ codebook 822 may have the last bit position 832 correspond with the DCI3 816 which is a group common DCI but without a DAI. The remaining DCIs (e.g., 812, 814, 818, and 820) may be scheduled by legacy DCI (e.g., DCI 1-x) which may be UE specific and may include a DAI, such that the DCIs having a DAI are positioned first in the codebook 822 based on the DAI value, such that the corresponding bits positions, preceding the bit to acknowledge the group common DCI, are ordered based on the corresponding DAI indication.

Figure 9:
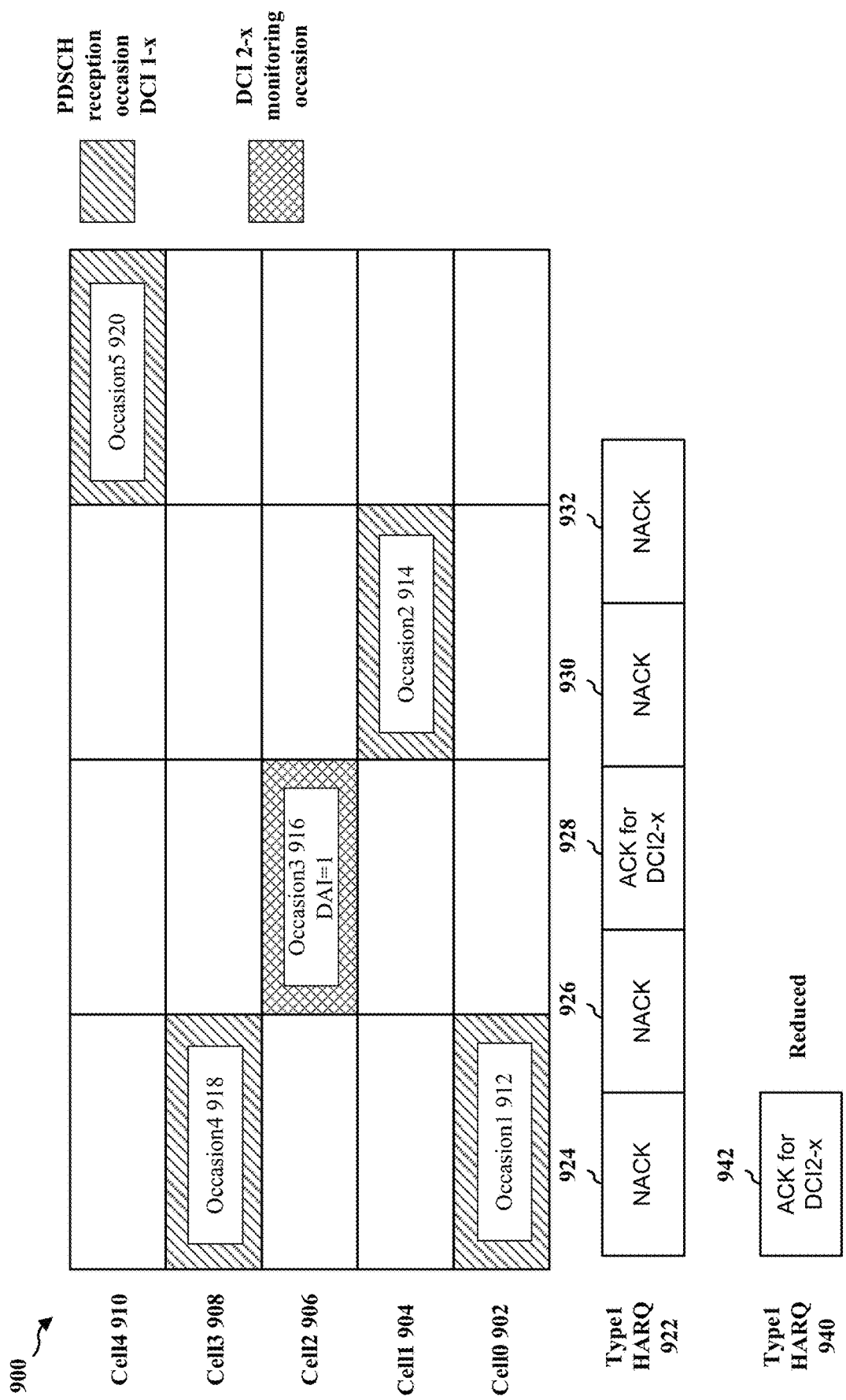
FIG. 9 is a diagram illustrating a codebook for acknowledgement of a DAI within the group common DCI.

FIG. 9 is a diagram 900 illustrating a configuration for acknowledging a group common DCI. The diagram 900 may include multiple cells (e.g., 902, 904, 906, 908, and 910) and multiple monitoring occasions.

In some aspects, the HARQ codebook size may be reduced when the UE receives only one group common DCI and is configured for type1 HARQ codebook. For example, if a UE reports a HARQ-ACK information in a PUCCH to acknowledge receipt of the group common DCI having a cDAI value of 1 within the occasions for candidate PDSCH receptions, the UE may configure a HARQ-ACK codebook that only acknowledges the receipt of the group common DCI by reducing the HARQ codebook size. In the diagram 900 of FIG. 9, the UE may receive the only group common DCI at occasion3 916 having a cDAI value of 1. The UE, at the other occasions (e.g., 912, 914, 918, and 920), may not receive anything or receive legacy DCIs. In such instances, the UE may generate the type1 HARQ codebook 922 with NACK bits 924, 926, 930, and 932 for each occasion (e.g., 912, 914, 918, and 920, respectively) that the UE did not receive anything or received a legacy DCI, along with the ACK 928 for the group common DCI received at occasion3 916, if the HARQ codebook size is not reduced. This codebook 922 may be long and may be reporting NACKs for instances where the base station did not send a DCI in one or more occasions. As such, the UE may be configured to generate a type1 HARQ codebook 940 with only one bit 942 that acknowledges the group common DCI received in occasion3 916 if the UE receives the only group common DCI at occasion3 916 having a cDAI value of 1.

Figure 10:
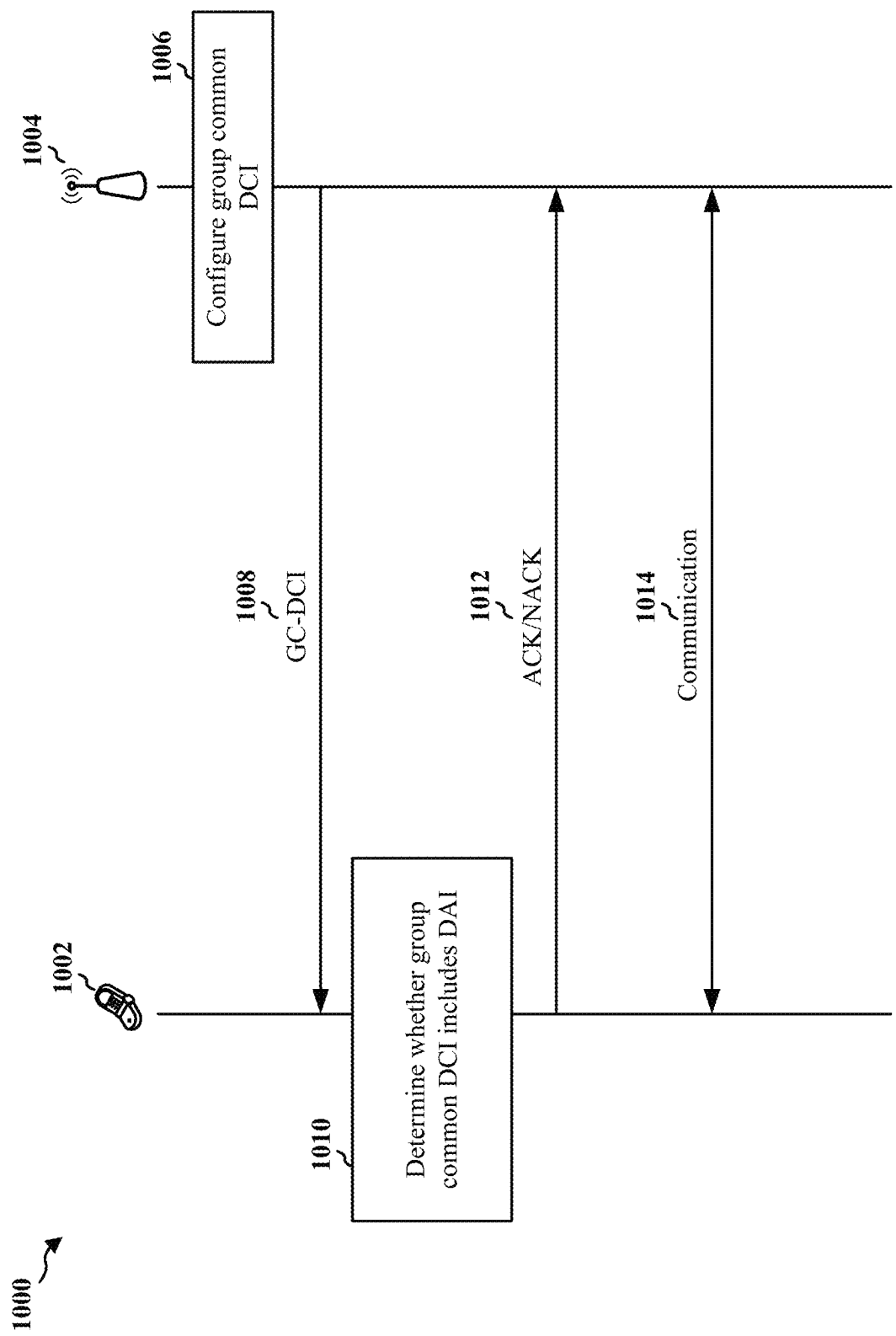
FIG. 10 is a call flow diagram of signaling between a UE and a base station in accordance with certain aspects of the disclosure.

FIG. 10 is a call flow diagram 1000 between a UE 1002 and a base station 1004. Optional aspects are illustrated with a dashed line. The base station 1004 may provide a cell serving UE 1002. For example, in the context of FIG. 1, the base station 1004 may correspond to the base station 102/180 and, accordingly, the cell may include a geographic coverage area 110 in which communication coverage is provided and/or small cell 102' having a coverage area 110'. Further, the UE 1002 may correspond to at least UE 104. In another example, in the context of FIG. 3, the base station 1004 may correspond to the base station 310 and the UE 1002 may correspond to the UE 350.

As illustrated in FIG. 10, the base station 1004 may configure a group common DCI. The base station 1004, at 1006, may configure the group common DCI for a set of UEs. In some aspects, the group common DCI may include at least one of a beam indication or a path loss reference signal (PL-RS) indication.

The base station 1004 may transmit the group common DCI to a set of UEs. The group common DCI may comprise at least one downlink assignment index (DAI) for at least one UE of the set of UEs. The UE 1002 may receive the group common DCI from the base station 1004. The UE 1002 may be within the set of UEs that receive the group common DCI from the base station 1004.

The UE 1002, at 1010, may determine whether the group common DCI 1008 received from the base station 1004 includes at least one DAI. In some aspects, the DAI may be indicated for each UE within the set of UEs. In some aspects, the DAI may include a count-DAI (cDAI). The cDAI may indicate a number of scheduled downlink transmissions. In some aspects, the DAI may include a total DAI (tDAI). The tDAI may indicate a total number of downlink transmissions received from the base station 1004.

The UE 1002 may transmit an acknowledgement (ACK) or a non-acknowledgement (NACK) 1012 in response to the determination of the group common DCI including the DAI. In some aspects, the transmission of the ACK or NACK, from the UE 1002 to the base station 1004, may occur at a group common DCI monitoring occasion. In some aspects, a bit location of the transmitted ACK or NACK may be based on a group common DCI monitoring occasion. In some aspects, a bit associated with the ACK or NACK may be appended to a type II HARQ codebook generated by the DAI. In some aspects, a size of a static HARQ-ACK codebook may be reduced. The size of the static HARQ-ACK codebook may be reduced if the UE receives the group common DCI having a special DAI value. For example, if the UE receives the group common DCI having a DAI value of 1, the UE may determine that the static HARQ-ACK codebook is only for acknowledging the group common DCI and may utilize a reduced HARQ-ACK codebook. In some aspects, the UE may determine a HARQ-ACK codebook to acknowledge the group common DCI, if the UE reports a HARQ-ACK transmission in a physical uplink control channel to acknowledge the group common DCI. The base station 1004 may receive, from the UE 1002, the ACK or NACK 1012 indicating whether the group common DCI received by the UE 1002 comprises a DAI.

At 1014, the UE 1002 and the base station 1004 communicate based on the group common DCI.

Figure 11:
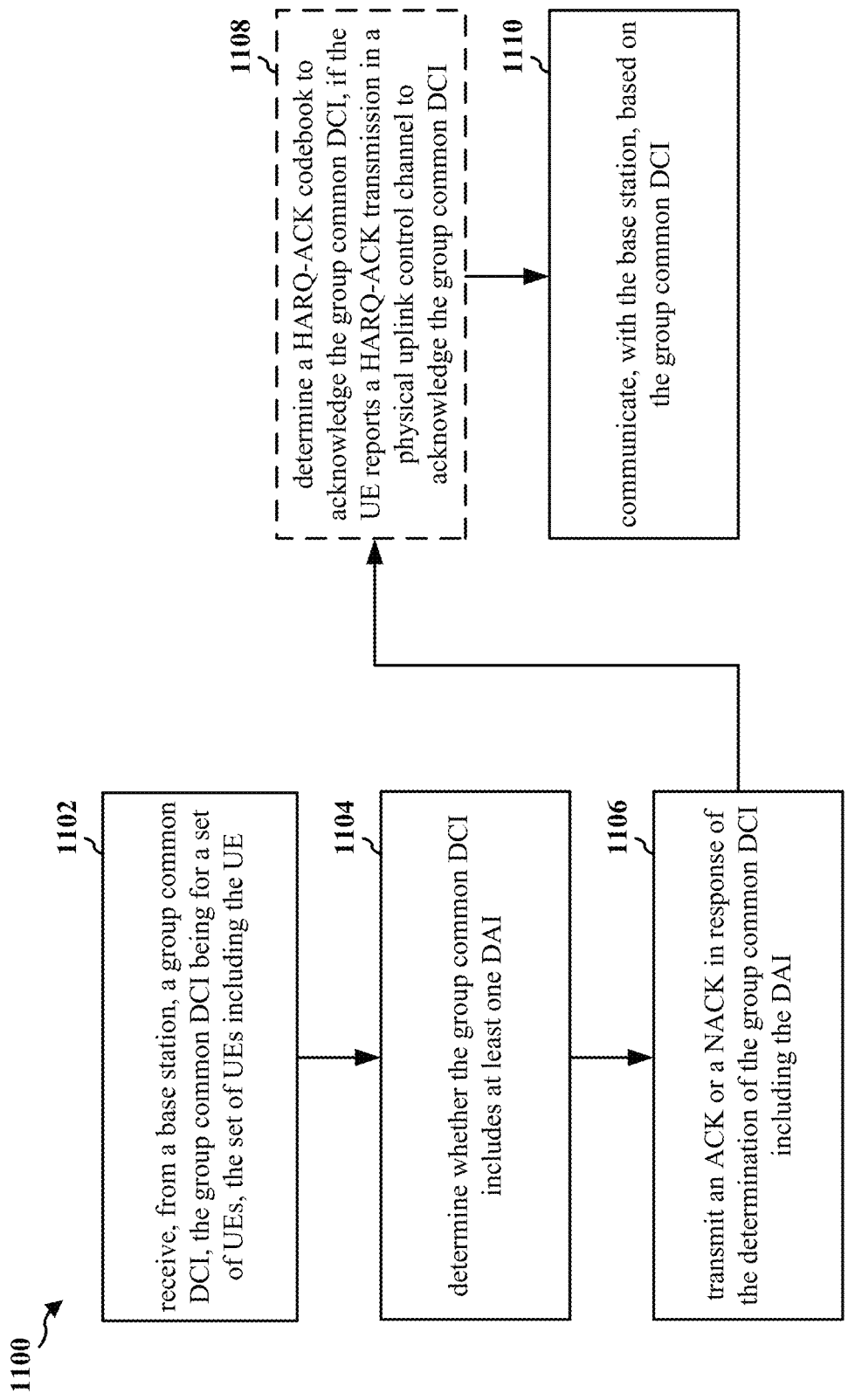
FIG. 11 is a flowchart of a method of wireless communication.

FIG. 11 is a flowchart 1100 of a method of wireless communication. The method may be performed by a UE or a component of a UE (e.g., the UE 104, 412, 414, 416, 420, 422, 424, 426, 1002; the device 350; a processing system, which may include the memory and component configured to perform each of the blocks of the method, and which may be the entire UE or a component of the UE, such as the TX processor 368, the RX processor 356, and/or the controller/processor 359). According to various aspects, one or more of the illustrated operations of the method 1100 may be omitted, transposed, and/or contemporaneously performed. Optional aspects are illustrated with a dashed line. The method may enable a UE to acknowledge receipt of a group common DCI.

At 1102, the UE may receive a group common DCI. The UE may receive the group common DCI from a base station. The group common DCI may be for a set of UEs. The set of UEs may include the UE. In some aspects, the group common DCI may include at least one of a beam indication or a PL-RS indication.

At 1104, the UE may determine whether the group common DCI includes at least one DAI. In some aspects, the DAI may be indicated for each UE of the set of UEs. In some aspects, the DAI may include a cDAI. The cDAI may indicate a number of scheduled downlink transmissions. In some aspects, the DAI may include a tDAI. The tDAI may indicate a total number of downlink transmissions.

At 1106, the UE may transmit an ACK or NACK to the base station. The UE may transmit the ACK or NACK to the base station in response to the determination of the group common DCI including the DAI. The UE may transmit the ACK to indicate that the group common DCI includes the DAI. The UE may transmit the NACK to indicate that the group common DCI does not include the DAI. The UE may transmit the NACK if the UE did not receive the group common DCI or if the UE did not properly receive or process the group common DCI. In some aspects, the transmission of the ACK or NACK may occur at a group common monitoring occasion. In some aspects, a bit location of the transmitted ACK or NACK may be based on the group common monitoring occasion. In some aspects, the bit associated with the ACK or NACK may be appended to a type II HARQ codebook. The type II HARQ codebook may be generated or based on the DAI. In some aspects, a size of a static HARQ-ACK codebook may be reduced. The size of the static HARQ-ACK codebook may be reduced if the UE receives the group common DCI having a special DAI value.

In some aspects, for example at 1108, the UE may determine a HARQ-ACK codebook to acknowledge the group common DCI. The UE may determine the HARQ-ACK codebook to acknowledge the group common DCI if the UE reports a HARQ-ACK transmission in a PUCCH to acknowledge the group common DCI.

At 1110, the UE may communicate with the base station based on the group common DCI.

The method in FIG. 11 may be performed by an apparatus that includes components configured to perform each of the blocks of the algorithm in the aforementioned flowchart of FIG. 11 and/or the aspects described in connection with the UE 1002 in FIG. 10. As such, each block in the aforementioned flowchart of FIG. 11 and/or the aspects described in connection with FIG. 10 may be performed by a component and the apparatus may include one or more of those components. The components may be one or more hardware components specifically configured to carry out the stated processes/algorithm, implemented by at least one processor (e.g., controller/processor 359, RX processor 356, and/or TX processor 368 with reference to FIG. 3) configured to perform the stated processes/algorithm, stored within a computer-readable medium (e.g., memory 360) storing computer executable code that—when executed by a processor—instruct the processor to perform aspects of FIGS. 10 and/or 11, or some combination thereof.

Figure 12:
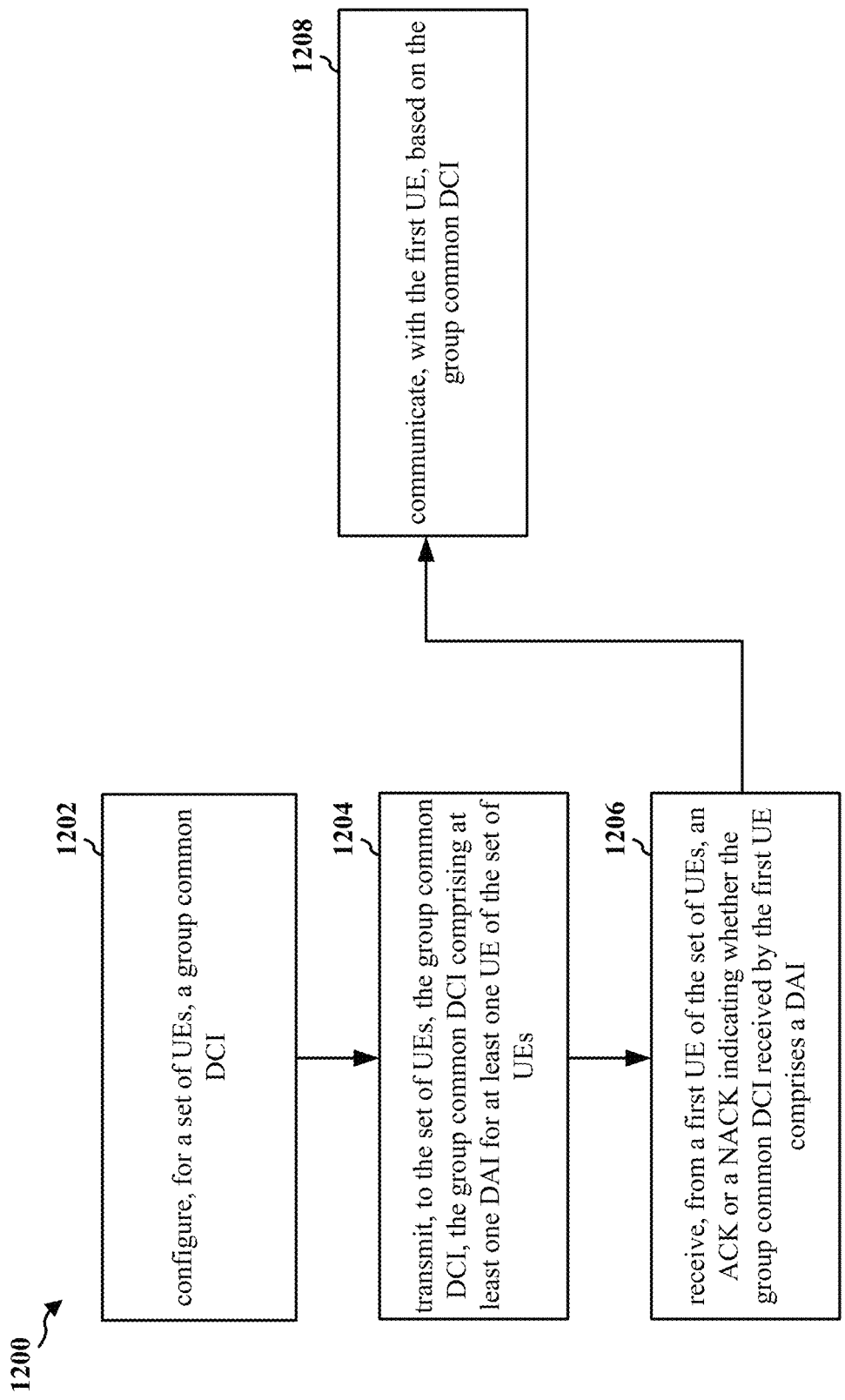
FIG. 12 is a flowchart of a method of wireless communication

FIG. 12 is a flowchart 1200 of a method of wireless communication. The method may be performed by a base station or a component of a base station (e.g., the base station 102, 180, 402, 1004; the device 310; a processing system, which may include the memory and component configured to perform each of the blocks of the method, and which may be the entire base station or a component of the base station, such as the TX processor 316, the RX processor 370, and/or the controller/processor 375). According to various aspects, one or more of the illustrated operations of the method 1000 may be omitted, transposed, and/or contemporaneously performed. Optional aspects are illustrated with a dashed line. The method may enable a base station to configure a UE to acknowledge receipt of a group common DCI.

At 1202, the base station may configure a group common DCI. The base station may configure the group common DCI for a set of UEs. In some aspects, the group common DCI may include at least one of a beam indication or a PL-RS indication.

At 1204, the base station may transmit the group common DCI. The base station may transmit the group common DCI to the set of UEs. The group common DCI may comprise at least one DAI for at least one UE of the set of UEs. In some aspects, the DAI may be indicated for each UE of the set of UEs. In some aspects, the DAI may include a cDAI. The cDAI may indicate a number of scheduled downlink transmissions. The cDAI may indicate the number of scheduled downlink transmissions for the respective UE with the base station. In some aspects, the DAI may include a tDAI. The tDAI may indicate a total number of downlink transmissions. The tDAI may indicate the total number of downlink transmissions for the respective UE with the base station.

At 1206, the base station may receive an ACK or a NACK. The base station may receive the ACK or NACK from a first UE of the set of UEs. The ACK or NACK may indicate whether the group common DCI received by the first UE includes a DAI. In some aspects, a bit location of the ACK or NACK, transmitted by the first UE, may be based on a group common monitoring occasion. In some aspects, the bit location associated with the ACK or NACK, transmitted by the first UE, may be appended to a type II HARQ codebook generated by the DAI. In some aspects, a size of a static HARQ-ACK codebook may be reduced if the UE receives the group common DCI having a special DAI value.

At 1208, the base station may communicate with the first UE based on the group common DCI.

The method in FIG. 12 may be performed by an apparatus that includes components configured to perform each of the blocks of the algorithm in the aforementioned flowchart of FIG. 12 and/or the aspects described in connection with the UE 1002 in FIG. 10. As such, each block in the aforementioned flowchart of FIG. 12 and/or the aspects described in connection with FIG. 10 may be performed by a component and the apparatus may include one or more of those components. The components may be one or more hardware components specifically configured to carry out the stated processes/algorithm, implemented by at least one processor (e.g., controller/processor 375, RX processor 370, and/or TX processor 316 with reference to FIG. 3) configured to perform the stated processes/algorithm, stored within a computer-readable medium (e.g., memory 376) storing computer executable code that—when executed by a processor—instruct the processor to perform aspects of FIGS. 10 and/or 12, or some combination thereof.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication at a user equipment (UE), comprising:
   a memory; and
   at least one processor coupled to the memory and configured to:
   receive, from a base station, group common downlink control information (DCI), the group common DCI being for a set of UEs, the set of UEs including the UE;
   determine whether the group common DCI includes at least one downlink assignment index (DAI);
   transmit an acknowledgement (ACK) or a non-acknowledgement (NACK) in response of the determination of the group common DCI including the DAI; and
   communicate, with the base station, based on the group common DCI.

2. The apparatus of claim 1, wherein the DAI is indicated for each UE of the set of UEs.

3. The apparatus of claim 1, wherein the DAI includes a count-DAI (cDAI), wherein the cDAI indicates a number of scheduled downlink transmissions.

4. The apparatus of claim 1, wherein the DAI includes a total DAI (tDAI), wherein the tDAI indicates a total number of downlink transmissions.

5. The apparatus of claim 1, wherein the group common DCI includes at least one of a beam indication or a path loss reference signal (PL-RS) indication.

6. The apparatus of claim 1, wherein the transmission of the ACK/NACK occurs at a group common DCI monitoring occasion.

7. The apparatus of claim 1, wherein a bit location of the transmitted ACK/NACK is based on a group common DCI monitoring occasion.

8. The apparatus of claim 1, wherein a bit associated with the ACK/NACK is appended to a type II HARQ codebook generated by the DAI.

9. The apparatus of claim 1, wherein a size of a static HARQ-ACK codebook is reduced if the UE receives the group common DCI with a special DAI value.

10. The apparatus of claim 1, wherein the at least one processor is further configured to:
    determine a HARQ-ACK codebook to acknowledge the group common DCI, if the UE reports a HARQ-ACK transmission in a physical uplink control channel to acknowledge the group common DCI.

11. A method of wireless communication at a user equipment (UE), comprising:
    receiving, from a base station, group common downlink control information (DCI), the group common DCI being for a set of UEs, the set of UEs including the UE;
    determining whether the group common DCI includes at least one downlink assignment index (DAI);
    transmitting an acknowledgement (ACK) or a non-acknowledgement (NACK) in response of the determination of the group common DCI including the DAI; and
    communicating, with the base station, based on the group common DCI.

12. The method of claim 11, further comprising:
    determining a HARQ-ACK codebook to acknowledge the group common DCI, if the UE reports a HARQ-ACK transmission in a physical uplink control channel to acknowledge the group common DCI.

13. The method of claim 11, wherein the DAI is indicated for each UE of the set of UEs.

14. The method of claim 11, wherein the DAI includes a count-DAI (cDAI), wherein the cDAI indicates a number of scheduled downlink transmissions.

15. The method of claim 11, wherein the DAI includes a total DAI (tDAI), wherein the tDAI indicates a total number of downlink transmissions.

16. The method of claim 11, wherein the transmission of the ACK/NACK occurs at a group common DCI monitoring occasion.

17. An apparatus for wireless communication at a base station, comprising:
a memory; and
at least one processor coupled to the memory and configured to:
configure, for a set of user equipments (UEs), a group common downlink control information (DCI);
transmit, to the set of UEs, the group common DCI, wherein the group common DCI comprising at least one downlink assignment index (DAI) for at least one UE of the set of UEs;
receive, from a first UE of the set of UEs, an acknowledgement (ACK) or a non-acknowledgement (NACK) indicating whether the group common DCI received by the first UE comprises a DAI; and
communicate, with the first UE, based on the group common DCI.

18. The apparatus of claim 17, wherein the DAI is indicated for each UE of the set of UEs.

19. The apparatus of claim 17, wherein the DAI includes a count-DAI (cDAI), wherein the cDAI indicates a number of scheduled downlink transmissions.

20. The apparatus of claim 17, wherein the DAI includes a total DAI (tDAI), wherein the tDAI indicates a total number of downlink transmissions.

21. The apparatus of claim 17, wherein the group common DCI includes at least one of a beam indication or a path loss reference signal (PL-RS) indication.

22. The apparatus of claim 17, wherein a bit location of the ACK or NACK, transmitted by the first UE, is based on a group common DCI monitoring occasion.

23. The apparatus of claim 17, wherein a bit associated with the ACK or NACK, transmitted by the first UE, is appended to a type II HARQ codebook generated by the DAI.

24. The apparatus of claim 17, wherein a size of a static HARQ-ACK codebook is reduced if the UE receives the group common DCI with a special DAI value.

25. A method of wireless communication at a base station, comprising:
configuring, for a set of user equipments (UEs), a group common downlink control information (DCI);
transmitting, to the set of UEs, the group common DCI, wherein the group common DCI comprising at least one downlink assignment index (DAI) for at least one UE of the set of UEs;
receiving, from a first UE of the set of UEs, an acknowledgement (ACK) or a non-acknowledgement (NACK) indicating whether the group common DCI received by the first UE comprises a DAI; and
communicating, with the first UE, based on the group common DCI.

26. The method of claim 25, wherein the DAI is indicated for each UE of the set of UEs.

27. The method of claim 25, wherein the group common DCI includes at least one of a beam indication or a path loss reference signal (PL-RS) indication.

28. The method of claim 25, wherein a bit location of the ACK or NACK, transmitted by the first UE, is based on a group common DCI monitoring occasion.

29. The method of claim 25, wherein a bit associated with the ACK or NACK, transmitted by the first UE, is appended to a type II HARQ codebook generated by the DAI.

30. The method of claim 25, wherein a size of a static HARQ-ACK codebook is reduced if the UE receives the group common DCI with a special DAI value.

* * * * *